United States Patent Office 3,206,298
Patented Sept. 14, 1965

3,206,298
FERTILIZER SUSPENSION COMPRISING PHOSPHATE ROCK AND NITROGEN-CONTAINING LIQUID
Donald J. Smalter, Deerfield, Ill., assignor to International Minerals & Chemical Corporation, a corporation of New York
No Drawing. Filed July 26, 1962, Ser. No. 212,718
5 Claims. (Cl. 71—49)

The present invention generally relates to a novel fertilizer containing a nitrogen-containing liquid and phosphate rock. In a specific aspect the invention relates to a novel fertilizer comprising a slurry of finely divided phosphate rock in liquid ammonia.

As is well known, phosphorus and nitrogen are essential plant nutrients and large tonnages of phosphorus and nitrogen compounds are provided in commercial fertilizers. The fertilizers must not only provide nitrogen and phosphorus, but these plant nutrients must be in available form, that is the nitrogen and phosphorus must be relatively soluble in the soil fluids so that they may be assimilated by the growing plant. Solid fertilizers have been used for many years. In recent years, the liquid mixed fertilizer industry has taken over a greater portion of the fertilizer market. Liquid fertilizers have some advantages over solid fertilizers, however, because of the solubility characteristics of the ingredients used in the preparation of liquid mixed fertilizers, the total plant nutrient composition of liquid fertilizers is limited to about 30%. Further, when liquid mixed fertilizers are cooled, solids frequently form in the solution which may clog distribution lines and which may only dissolve slowly upon subsequent heating of the solution. Furthermore, it is not generally economical to ship these solutions for long distances from the plant because of the high water content of the liquid fertilizer.

More recently, slurry fertilizers have been prepared and used successfully. Slurry fertilizers are fluid fertilizers comprising an admixture of small particles of fertilizer ingredient and a liquid. The liquid phase is usually a substantially saturated fertilizer solution. Because solids are not troublesome in slurry fertilizers, the fertilizer ingredients used need not be highly purified but may contain insoluble impurities. Slurry fertilizers, therefore, have the advantage of lower cost raw materials as compared to liquid fertilizers. Further, since slurry fertilizers are not limited by solubility characteristics, slurry fertilizers may contain a relatively high percentage of plant nutrients. Although the slurry fertilizers used heretofore contained some of the plant nutrients in finely divided solid form, the solid phase consisted of plant nutrients which are normally considered soluble in the soil fluids. The slurry fertilizer of the present invention is novel in that the plant nutrient in the solid phase is in a form which is generally considered relatively insoluble in soil fluids.

Accordingly, it is an object of the present invention to provide a novel slurry fertilizer.

It is a further object of the invention to provide a novel slurry fertilizer in which the solid phase includes a plant nutrient compound which is relatively insoluble in soil fluids.

It is an additional object of the present invention to provide a novel process for fertilizing soil.

It is a specific object of the present invention to provide a novel fertilizer material comprising a slurry of finely divided phosphate rock in a nitrogen-containing liquid.

These and other objects and advantages of the present invention will be apparent from the description of the invention.

Generally described, the present invention is a novel fertilizer composition comprising a slurry of finely divided phosphate rock in a nitrogen-containing liquid.

Prior to the present invention, finely divided phosphate rock has been applied directly to the soil; however, it has been generally recognized that phosphate rock is relatively insoluble in soil fluids and that the phosphorus in the rock is available to plants only at an extremely slow rate. It is chiefly for this reason that phosphate rock is usually first acidified with a strong mineral acid, such as sulfuric acid, phosphoric acid or nitric acid, to convert the phosphorous into more water soluble compounds such as exist in superphosphate and triple superphosphate before application to the soil. The phosphorus plant nutrient has also been applied to the soil as phosphoric acid.

It is, however, generally more costly to apply phosphorus to soils as superphosphate, triple superphosphate and/or phosphoric acid than as phosphate rock, on the basis of equivalent amounts of phosphorus applied. It is, however, because of the relative insolubility of the phosphate rock in soil fluids and the attendant unavailability of the phosphorus in the rock to plants that phosphate rock as such is not generally used in fertilizers but is first converted into more water soluble form.

The present invention is in part based on the discovery that as compared to phosphate rock applied directly to the soil, the phosphorus is more available to plants when the phosphate rock is first admixed with a nitrogen-containing liquid and the admixture applied to the soil. The nitrogen-containing liquid and the phosphate rock must, however, be in intimate admixture before application to the soil.

The phosphate rock utilized in the present invention may be any suitable phosphate rock. The source of the phosphate rock is not critical and, inter alia, Florida pebble phosphate rock, Tennessee phosphate rock, as well as phosphate rock from our Western states and foreign countries may be used. It is, of course, preferable to use beneficiated phosphate rock having a BPL content of at least 60%, although lower quality rock may be used. The term "bone phosphate of lime," commonly abbreviated to BPL, is generally used to express the phosphate content of fertilizers. This is the equivalent of $Ca_3(PO_4)_2$. In the analysis of phosphate rock, the chemist generally reports the phosphorus content in terms of phosphorus pentoxide ($P_2O_5$).

The phosphate rock is used in finely divided form. It is preferably at least about 90% of $-100$ mesh particle size. More preferably, it is at least about 90% $-100$ mesh and at least about 50% $-200$ mesh particle size. Comminution of phosphate rock to such a finely divided state may be effected in any suitable manner. Such finely divided phosphate rock is also commercially available.

Any suitable nitrogen-containing liquid may be used. The liquid does not contain elemental nitrogen but does contain a substantially water soluble nitrogen compound. Ammonia is preferably used in the practice of the present invention and may be anhydrous liquid ammonia or aqueous ammonia. Higher ammonia concentrations in aqueous ammonia are preferred so as to maintain a high total nitrogen content in the fertilizer composition although lower concentrations may be used if desired. In general, it is preferred that the aqueous ammonia contain at least 10% by weight ammonia and more preferably at least 15% by weight ammonia. The upper limit of concentration is, of course, essentially anhydrous ammonia. Sufficient pressure is, of course, maintained on the ammonia and phosphate rock admixture to prevent loss of ammonia before it is applied to the soil. Other nitrogen-containing liquids include, inter alia, the so-called nitrogen solutions which are water solutions containing at least two of the following sources of nitrogen: ammonia, urea and ammonium nitrate. Water solutions of urea or ammonium nitrate or ammonium sulfate, or other substantially water soluble nitrogen compound may be used.

The admixing of the phosphate rock and liquid may be effected in any suitable manner to achieve intimate admixing of the materials. The nitrogen-containing liquid may be added to a body of phosphate rock, or phosphate rock may be added to a body of the liquid, or streams of these materials may be simultaneously introduced into a contacting zone. The admixture is preferably agitated sufficiently to obtain a uniform slurry or suspension of phosphate rock in the liquid. It is also within the scope of the present invention to admix anhydrous ammonia with phosphate rock and to subsequently add water.

The relative amounts of phosphate rock and nitrogen-containing liquid are usually controlled to give the desired ratio of nitrogen/phosphorus in the fertilizer composition. The upper limit of phosphate rock is, of course, somewhat determined by the amount that can be admixed with the liquid and still maintain a fluid body that can be utilized in slurry fertilizer distributing equipment. In general, the relative amounts of phosphate rock and liquid are such that the admixture resembles a relatively free flowing liquid instead of a paste. In other words, it is preferable that the phosphate particles be in suspension in the liquid.

In general, the admixture of phosphate rock and nitrogen-containing liquid contains at least 5% $P_2O_5$ by weight and more preferably at least 10% $P_2O_5$ by weight from the phosphate rock, and at least 5% by weight nitrogen and more preferably at least 10% by weight nitrogen from the nitrogen-containing liquid.

It is within the scope of the present invention to have other fertilizer ingredients such as nitrogen compounds, phosphorus compounds and/or potassium compounds present in the admixture of nitrogen-containing liquid and phosphate rock, although they need not be present.

Trace elements may also be added to the admixture and may be present as chelated compounds, soluble compounds, or insoluble compounds in finely divided form. The trace elements required for good plant growth are well known and include, inter alia, iron, magnesium, manganese, boron, copper, zinc, etc.

It is also within the scope of the present invention to add surface active agents to the admixture to help to maintain the suspension or to more readily disperse the solid phosphate rock phase throughout the liquid phase. The surface active agents are preferably of the non-foaming type such as, inter alia, aryl alkyl sulfonates.

Other additions such as attapulgite clay and bentonite clay, etc., which are frequently used in slurry type fertilizers may also be used in conventional manner and in conventional amount.

The novel fertilizer material of the present invention may be applied to the soil in any suitable manner. Band application, as contrasted to broadcast application is preferred. Band application includes operations such as side dressing, row fertilization, and starter fertilization. Band application is preferred so as to keep the nitrogen concentration high in the same area that the phosphate rock is present. This is preferred since it has been noted that when the composition is added to the soil, the nitrogen compound will oxidize and increase the acidity of the soil and the phosphate rock is more soluble in acid soils. One postulated mechanism is that the nitrogen compound is converted to nitrogen-containing acids, which acids in turn react with the phosphate rock to form water-soluble phosphorus compounds which are assimilated by the plants growing in the soil. The foregoing theory is offered in the interest of completeness and is not limiting or definitive of this aspect of the invention.

In order to give a fuller understanding of the invention, but with no intention to be limited thereto, the following specific examples are given.

Example I

A sample of 76 BPL Florida pebble phosphate rock was ground to 90% —100 mesh and 50% —200 mesh. The ground rock and attapulgite clay were added to anhydrous ammonia in amounts to give an admixture containing 50% by weight phosphate rock, 1% by weight attapulgite clay, and 49% anhydrous ammonia. The admixture was agitated in a closed tank to prevent loss of ammonia. The admixture was agitated for 15 minutes to uniformly suspend the phosphate rock in the liquid anhydrous ammonia.

The resulting anhydrous ammonia-phosphate rock admixture is applied in a narrow band to the root zone of a row of growing corn. The phosphorus in the phosphate rock will be made available to the growing corn and taken up by the growing corn at a greater rate as compared to adding an equivalent amount of phosphate rock not in admixture with ammonia to the plants.

Example II

A slurry of 60% phosphate rock, ½% attapulgite clay and 39½% anhydrous ammonia was prepared in substantially the same manner as described above in Example I. The admixture had a consistency about that of corn syrup. The admixture is a good slurry fertilizer.

Example III

A slurry of 75% phosphate rock, ½% attapulgite clay and 24½% anhydrous ammonia was prepared in substantially the same manner as described above in Example I. The slurry was very thick and represents about the upper limit of phosphate rock in anhydrous ammonia that can be prepared and handled in available fertilizer spreading equipment.

Example IV

A slurry fertilizer was prepared by admixing a commercially available urea-ammonium nitrate solution sold under the trade name URAN 32 and finely divided 76 BPL phosphate rock. The resultant slurry contained 33% phosphate rock and 67% by weight solution.

Example V

A complete fertilizer (containing N, P and K) was prepared by adding —100 mesh 68 BPL phosphate rock, muriate of potash (60% $K_2O$) and attapulgite clay to anhydrous ammonia and vigorously agitating the admixture. The resultant slurry contained 44% phosphate rock, 26% KCl, ½% attapulgite clay and 29½% anhydrous ammonia. The admixture analyzed 24.3% N, 13.7% $P_2O_5$ and 15.6% $K_2O$. The slurry had the consistency of heavy syrup. When applied to the soil, the slurry supplies nitrogen, phosphorus and potassium to the plants.

Example VI

A complete fertilizer was prepared by admixing a commercially available ammonium nitrate-ammonia-water solution with —100 mesh 68% BPL phosphate rock, muriate of potash (60% $K_2O$) and attapulgite clay in proportions to give a slurry containing 26.8% phosphate rock, 15.8% KCl and ½% attapulgite. The complete slurry fertilizer had the following analysis: 21.0% N, 8.3% $P_2O_5$ and 9.5% $K_2O$. The viscosity of the slurry was about 1200 centipoises.

The description of the invention utilized specific reference to certain details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims:

1. A novel fertilizer material comprising a suspension of phosphate rock of about 90% —100 mesh size in an amount to provide a $P_2O_5$ content of at least about 5% by weight of said fertilizer material in a nitrogen-containing liquid of the group consisting of liquid ammonia, aqueous solutions of ammonia, aqueous solutions of urea, aqueous solutions of ammonium salts, and aqueous solutions of nitrate salts, said nitrogen-containing liquid being present in an amount to provide at least 5% by weight of nitrogen in said fertilizer material.

2. A novel fertilizer material comprising phosphate rock of about 90% —100 mesh size in an amount to provide a $P_2O_5$ content of at least about 5% by weight of said fertilizer material suspended in liquid ammonia in an amount to provide at least 5% by weight nitrogen in said fertilizer material.

3. A composition in accordance with claim 2 in which said liquid ammonia comprises anhydrous liquid ammonia.

4. A composition in accordance with claim 2 in which said finely divided phosphate rock is at least 50% —200 mesh size and is present in an amount to provide a $P_2O_5$ content of at least about 10% by weight of said fertilizer material.

5. A composition in accordance with claim 2 in which said liquid ammonia is present in the amount to provide at least about 10% by weight ammonia in said fertilizer material.

References Cited by the Examiner

UNITED STATES PATENTS

| | | | |
|---|---|---|---|
| 450,253 | 4/91 | Reese | 71—47 |
| 1,071,795 | 9/13 | Reichelt | 71—51 |
| 1,252,318 | 1/18 | Blumenberg | 71—43 |
| 1,261,116 | 4/18 | Gardiner | 71—51 |
| 1,279,838 | 9/18 | Carter | 71—33 |
| 1,406,455 | 2/22 | Halvorsen | 71—33 |
| 1,849,987 | 3/32 | Moore | 71—43 |
| 1,894,767 | 1/33 | Harvey | 71—43 |
| 2,713,536 | 7/55 | Driskell | 71—42 |
| 2,762,698 | 9/56 | Barnes | 71—42 |

DONALL H. SYLVESTER, *Primary Examiner.*

ANTHONY SCIAMANNA, *Examiner.*